(12) United States Patent
Bhat et al.

(10) Patent No.: US 7,953,513 B2
(45) Date of Patent: May 31, 2011

(54) SYSTEMS, DEVICES, AND METHODS FOR AUTOMATION CONTROL

(75) Inventors: Ajit Keshay Bhat, Alpharetta, GA (US); Emmanuel Bisse, Washington, NJ (US); Matthias Erhardt, Suwanee, GA (US); Michael Foote, Waterford, MI (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 11/287,663

(22) Filed: Nov. 28, 2005

(65) Prior Publication Data

US 2006/0212161 A1  Sep. 21, 2006

Related U.S. Application Data

(60) Provisional application No. 60/661,979, filed on Mar. 15, 2005.

(51) Int. Cl.
*B29C 39/00* (2006.01)

(52) U.S. Cl. .......................................... 700/197; 700/17
(58) Field of Classification Search .................. 700/2, 7, 700/17, 56–64, 83, 97, 189, 197, 202, 205; 708/290, 300
See application file for complete search history.

(56) References Cited

U.S. PATENT DOCUMENTS

| | | | | |
|---|---|---|---|---|
| 5,007,818 A | | 4/1991 | Barancik | |
| 5,062,052 A | * | 10/1991 | Sparer et al. | 700/197 |
| 5,130,630 A | * | 7/1992 | Handte | 318/567 |
| 5,198,161 A | * | 3/1993 | Ogura et al. | 264/40.5 |
| 5,325,287 A | * | 6/1994 | Spahr et al. | 700/17 |
| 5,362,222 A | | 11/1994 | Faig | |
| 5,801,942 A | * | 9/1998 | Nixon et al. | 700/83 |
| 6,185,477 B1 | * | 2/2001 | Palm et al. | 700/197 |
| 6,220,743 B1 | * | 4/2001 | Campestre et al. | 700/97 |
| 6,816,820 B1 | * | 11/2004 | Friedl et al. | 703/2 |
| 7,058,475 B2 | * | 6/2006 | Erhardt | 700/197 |
| 7,121,821 B2 | * | 10/2006 | Pickel | 425/174.4 |
| 2002/0173860 A1 | * | 11/2002 | Bruce et al. | 700/17 |
| 2003/0182010 A1 | * | 9/2003 | Erhardt | 700/117 |

OTHER PUBLICATIONS

"Siemens SIMATIC HMI, Panel PC 670 Commissioning Instructions", Siemens Corporation.*
Siemens Company Webpage, "WinACBasis/RTX—PC Based Automation—Siemens".*
"PL7 Junior/Pro Premium PLC applications Motion control Trajectory Editor", Telemecanique, Dec. 2004.*
"QuickPanel, View & Control", GE Fanuc, 2004.*
"Intelligence PanelClient Pro", GE Fanuc Automation, 2005.*
"Embedded Automation Control", OSAI Automation, Mar. 2005.*

* cited by examiner

*Primary Examiner* — Paul L Rodriguez
*Assistant Examiner* — Carlos Ortiz Rodriguez
(74) *Attorney, Agent, or Firm* — Jose R. de la Rosa

(57) ABSTRACT

Certain exemplary embodiments comprise a method comprising a plurality of activities comprising via a graphical editor running on a Human Machine Interface comprising a first embedded operating system, providing a plurality of set points related to a process to a programmable logic controller. The method can comprise, via the programmable logic controller, automatically controlling the process responsive to information received from the graphical editor.

21 Claims, 3 Drawing Sheets

SYSTEMS, DEVICES, AND METHODS FOR AUTOMATION CONTROL

CROSS-REFERENCES TO RELATED APPLICATIONS

This application claims priority to and incorporates by reference herein in its entirety, pending U.S. Provisional Patent Application Ser. No. 60/661,979, filed 15 Mar. 2005.

BACKGROUND

Industrial processes such as blow molding can be automated to improve productivity. The blow molding process can be adapted to form hollow plastic products such as bottles, trash receptacles, gas tanks, and/or car bumpers, etc. The blow molding process can comprise four stages: extrusion, pinch-off, blowing, and cooling. A goal of the blow molding process can be to produce a blown product with a thickness distribution adapted to provide mechanical strength while attempting to optimize weight and material costs. The parison (or the hollow plastic tube) extruded in the first phase can define a thickness profile. The parison can be extruded through a die with a movable inner mandrel. Mandrel motion can provide a degree of freedom for a designer in specifying a thickness of the parison. In order to adjust the thickness profile of the parison, the mandrel can be moved up and down and/or side to side according to a predefined sequence. Moving the mandrel can be adapted to at least partially open, close, or change a dimension of, a die aperture, thereby influencing the thickness of the plastic flowing through the aperture, and thus creating a parison thickness profile. By adding a parison thickness control, the wall thickness of the extruded parison can be controlled, which can influence the material distribution in the finished product. Several trial cycles can be utilized to determine a desired profile, and an editor can be used for creating and/or modifying profiles. General purpose and/or personal computers can be utilized for profile editing. Yet for at least industrial environments, such computers can lack adequate reliability. Hence disclosed herein are exemplary embodiments of various systems, devices, and methods for automation control based on one or more embedded operating systems.

SUMMARY

Certain exemplary embodiments comprise a method comprising a plurality of activities comprising via a graphical editor running on a Human Machine Interface comprising a first embedded operating system, providing a plurality of set points related to a process to a programmable logic controller. The method can comprise, via the programmable logic controller, automatically controlling the process responsive to information received from the graphical editor.

BRIEF DESCRIPTION OF THE DRAWINGS

A wide variety of potential embodiments will be more readily understood through the following detailed description of certain exemplary embodiments, with reference to the accompanying exemplary drawings in which.

DEFINITIONS

Figure 1:
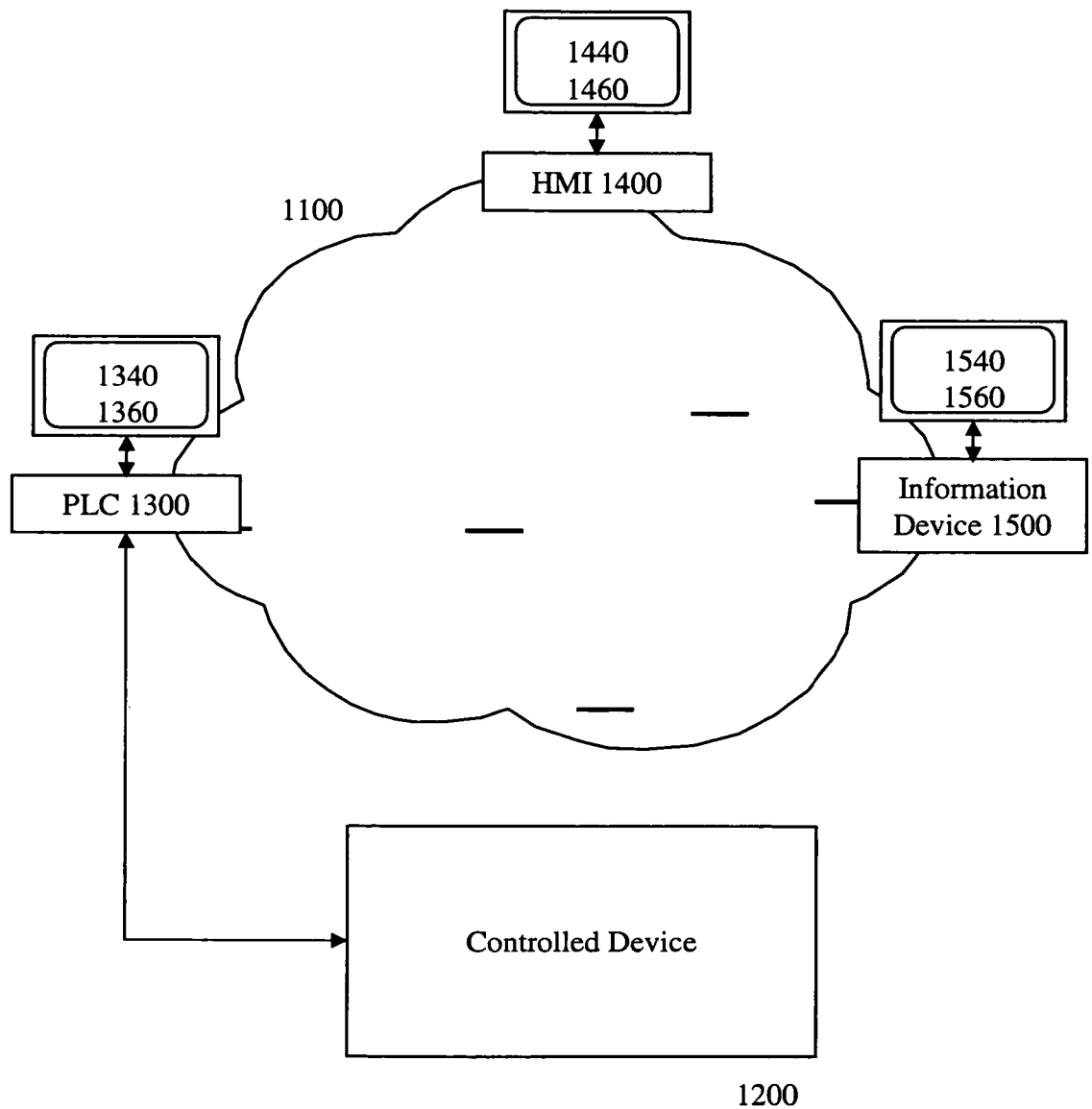
FIG. 1 is a block diagram of an exemplary embodiment of a system 1000.

When the following terms are used substantively herein, the accompanying definitions apply:

a—at least one.

Active X control—a plurality of user interface elements created using software components that are interconnected and perform the desired functions for an application.

activity—an action, act, step, and/or process or portion thereof.

adapted to—capable of performing a particular function.

allowed—possible to use.

and/or—either in conjunction with or in alternative to.

apparatus—an appliance or device for a particular purpose.

associated—related to.

automatic linear interpolation—via a computer, via a linear calculation, estimating a value located numerically between two known values.

automatically—acting or operating in a manner essentially independent of external influence or control. For example, an automatic light switch can turn on upon "seeing" a person in its view, without the person manually operating the light switch.

calculate—compute.

calibration—a checking of an instrument against a reference point or standard.

can—is capable of, in at least some embodiments.

combination—two or more values.

comprising—including but not limited to.

control—(n) a mechanical or electronic device used to operate a machine within predetermined limits.

control—(v) to operate and/or regulate within predetermined limits.

data—distinct pieces of information, usually formatted in a special or predetermined way and/or organized to express concepts.

define—to establish the outline, form, or structure of.

determine—ascertain, obtain, and/or calculate.

device—a machine, manufacture, and/or collection thereof.

diagnostic message screen—a rendering indicative of a status of at least one device and/or process.

Dynamic Link Library rile—a plurality of executable machine readable instructions adapted to allow programs to share code and other resources to perform particular tasks.

embedded operating system—a plurality of machine-readable instructions that define a limited set of pre-defined functions that can not be modified or added to by additional user-installed software, although some embedded systems allow a user to modify values of variables and/or parameters of the pre-defined functions. Exemplary devices that can comprise embedded systems are: calculators, automobiles, airplanes, vending machines, toys, programmable logic controllers, appliances, refrigerators, microwave ovens, clothes washers, thermostats, alarm systems, sprinkler systems, lighting controllers, electronic equipment, laser printers, CD players, DVD players, watches, and/or digital cameras, etc.

executable file—a plurality of machine readable instructions formatted in a manner that can be directly executed by an information device.

execute—to carry out instructions.

field bus—an electrically conductive medium adapted to convey signals between devices and/or interface boards and a programmable logic controller.

graphical parison editor—a rendered interface adapted to provide parison profile information to a user and/or receive parison profile information from a user.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

hard real-time—relating to computer systems that provide an absolute deterministic response to an event. Such a response is not based on average event time. Instead, in such computer systems, the deadlines are fixed and the system must guarantee a response within a fixed and well-defined time. Systems operating in hard real-time typically interact at a low level with physical hardware via embedded systems, and can suffer a critical failure if time constraints are violated. A classic example of a hard real-time computing system is the anti-lock brakes on a car. The hard real-time constraint, or deadline, in this system is the time in which the brakes must be released to prevent the wheel from locking. Another example is a car engine control system, in which a delayed control signal might cause engine failure or damage. Other examples of hard real-time embedded systems include medical systems such as heart pacemakers and industrial process controllers.

Human Machine Interface—hardware and/or software adapted to render information to a user and/or receive information from the user.

indicative—serving to indicate.

information—processed, stored, and/or transmitted data.

information device—any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

initiating—beginning.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

instructions—directions adapted to perform a particular operation or function.

interpolate—to estimate a value, via a calculation located numerically between two known values.

less than—fewer numerically.

machine instructions—directions adapted to cause a machine to perform a particular operation or function.

machine readable medium—a physical structure from which a machine can obtain data and/or information. Examples include a memory, punch cards, etc.

master point—a defined set point associated with parison production, the defined set point utilized for calculating one or more estimated set points.

may—is allowed and/or permitted to, in at least some embodiments.

measurement—an observed characteristic.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

modify—to change.

motion control—regulation of a position of a device over time.

network—a communicatively coupled plurality of nodes.

network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

number—a count.

obtain—to procure and/or receive.

parison—an extruded hollow plastic tube used for blow molding.

parison head—a device adapted to produce a parison via extrusion.

plastics blow molding—a blow molding process in which a parison is initially formed by extruding molten plastic through a die, during and/or after which a tube blows air inside the forming and/or formed parison, forcing the parison to take a shape of a surrounding mold.

plurality—the state of being plural and/or more than one.

predetermined—established in advance.

process—a series of actions, changes, or functions bringing about a result.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

profile—a representation and/or description of an object or structure.

programmable logic controller (PLC)—a solid-state, microprocessor-based, hard real-time computing system that is used, via a network, to automatically monitor the status of field-connected sensor inputs, and automatically control communicatively-coupled devices of a controlled industrial system (e.g., actuators, solenoids, relays, switches, motor starters, speed drives (e.g., variable frequency drives, silicon-controlled rectifiers, etc.), pilot lights, igniters, tape drives, printers, monitors, displays, etc.) according to a user-created set of values and user-created logic and/or instructions stored in memory. The sensor inputs reflect measurements and/or status information related to the controlled industrial system. A PLC provides any of: automated input/output control; switching; counting; arithmetic operations; complex data manipulation; logic; timing; sequencing; communication; data file manipulation; report generation; control; relay control; motion control; process control; distributed control; and/or monitoring of processes, manufacturing equipment, and/or other automation of the controlled industrial system. Because of its precise and hard real-time timing and sequencing capabilities, a PLC is programmed using ladder logic or some form of structured programming language specified in IEC 61131-3, namely, FBD (Function Block Diagram), LD (Ladder Diagram), ST (Structured Text, Pascal type language), IL (Instruction List) and/or SFC (Sequential Function Chart). Because of its precise and real-time timing and sequencing capabilities, a PLC can replace up to thousands of relays and cam timers. PLC hardware often has good redundancy and fail-over capabilities. A PLC can use a Human-Machine Interface (HMI) for interacting with users for configuration, alarm reporting, and/or control.

provide—to furnish and/or supply.

receive—accept something provided and/or given.

recipe—a plurality of machine readable, user-defined values adapted to achieve a particular result via a programmable logic controller.

relative—in comparison with.

render—make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

responsive—reacting to an influence and/or impetus.

run—execute at least one machine readable instruction.

sending—to convey.

set—a related plurality.

set point—a data value assigned to a process step. The value refers to a position that a valve controlling a flow of molten plastic is commanded to go to in a sequence of operations related to blow molding.

simultaneously—happening, existing, or done at the same time smooth interpolation—via a computer, via a non-linear calculation, estimating a value located numerically between two known values.

soft real-time—relating to computer systems that take a best efforts approach and minimize latency from event to response as much as possible while keeping throughput up with external events overall. Such systems will not suffer a critical failure if time constraints are violated. For example, live audio-video systems are usually soft real-time; violation of time constraints can result in degraded quality, but the system can continue to operate. Another example is a network server, which is a system for which fast response is desired but for which there is no deadline. If the network server is highly loaded, its response time may slow with no failure in service. This is contrasted with the anti-lock braking system where a slow down in response would likely cause system failure, possibly even catastrophic failure.

substantially—to a great extent or degree.

system—a collection of mechanisms, devices, data, and/or instructions, the collection designed to perform one or more specific functions.

temperature control setting—a value indicative of a temperature target associated with a plastic blow molding process.

transmit—to convey (force or energy) from one part of a mechanism to another.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

via—by way of and/or utilizing.

DETAILED DESCRIPTION

Certain exemplary embodiments comprise a method comprising a plurality of activities comprising via a graphical editor running on a Human Machine Interface comprising a first embedded operating system, providing a plurality of set points related to a process to a programmable logic controller. The method can comprise, via the programmable logic controller, automatically controlling the process responsive to information received from the graphical editor.

FIG. 1 is a block diagram of an exemplary embodiment of a system 1000, which can be adapted to control a process, such as an industrial process, which can be, for example, a process adapted for plastic blow molding, plastic resin manufacturing, petrochemical refining, fertilizer manufacturing, metal machining, automobile component fabrication, investment casting, powder metallurgy, mining equipment manufacturing, mining, mineral processing, integrated circuit manufacturing, and/or printed circuit board manufacturing, etc.

A plurality of information devices can be communicatively coupled directly and/or indirectly to the process via a network 1100. Network 1100 can be and/or utilize any of a wide variety of networks, such as a field bus network, circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone network, and/or one or more Internet service providers, and/or one or more information devices, such as a switch, router, and/or gateway not directly connected to a local area network, etc.

System 1000 can comprise a programmable logic controller (PLC) 1300, which can comprise a plurality of instructions, such as a user program 1360, adapted to provide control instructions to at least one controlled device 1200, such as a motion control module, a control valve, an actuator, etc., and/or to provide and/or receive information related to the process. PLC 1300 can comprise a user interface 1340, which can be adapted to render and/or output information related to controlled device 1200 and/or the process.

PLC 1300 can be communicatively coupled to a Human Machine Interface (HMI) 1400 via network 1100. HMI 1400 can comprise a user program 1460, which can be adapted to receive information from a user regarding controlled device 1200 and/or the process. The information from the user can comprise a plurality of set points related to controlled device 1200 and/or controlling the process. HMI 1400 can comprise a user interface 1440 adapted to render information prompting the user for the information regarding controlled device 1200 and/or controlling the process and/or rendering information regarding controlled device 1200 and/or controlling the process for the user.

System 1000 can comprise off-the-shelf hardware, firmware, and/or software components and specialized application software. For example, system 1000 can comprise HMI 1400, PLC 1300, and/or controlled device 1200 for closed-loop positioning, each of which can be communicatively coupled with each other via network 1100. For blow molding machines, PLC 1300 can comprise software comprising functional blocks for temperature closed-loop control, travel sensing and wall thickness open-loop control, and/or mandrel position closed loop control.

In certain exemplary embodiments, HMI 1400 can comprise an embedded operating system. HMI 1400 can be adapted to provide a graphical editor and an interface to controlled device 1200. In plastics blow molding applications, the graphical editor can be a graphical parison editor. In certain exemplary embodiments, HMI 1400 can comprise a plurality of features on a single open platform panel. Features can comprise a display of actual profile data and set point profile data, an editor for quickly adjusting one or more set points related to controlled device 1200 and/or generating one or more new set points related to controlled device 1200. Features of HMI 1400 can comprise closed-loop motion control parameter set-up as well as recipe storage and retrieval. In plastic blow molding applications, the editor can comprise a plurality of machine-readable instructions adapted to perform automatic linear or smooth interpolation features between master points and up to a predetermined number of set points for parison profiling. The predetermined number of set points can be any number such as approximately 2, 13, 20, 29, 37, 100, 149, 184, 256, 309, 555, 899, 1000, 4003, 9999, and/or any value therebetween. Master-points and/or set points can be related to machinery and/or instrumentation in the process. For example, master points and/or set points can relate to one or more machine position, valve position, gap, flow rate, energy rate, temperature, pressure, humidity, weight, mass, tensile strength, impact resistance, mechanical property, fluidic property, electrical property, optical property, physical dimension, and/or product appearance, etc.

In certain exemplary embodiments, the master-points and/or set points can be adapted to control embodiments wherein the process comprises a metal milling operation for manufacturing metal parts, such as for an automobile. In such applications, the graphical editor can be adapted to receive and/or determine a part profile comprising master-points and/or set points. The master-points and/or set points can determine a plurality of machine positions related to the metal milling operation.

In certain exemplary embodiments, the master-points and/or set points can be adapted to control embodiments wherein the process comprises a petrochemical refining operation for manufacturing organic chemicals, such as for plastics manufacturing. In such applications, the graphical editor can be adapted to receive and/or determine chemical and/or physical plastic characteristics, which can be related to master-points and/or set points. The master-points and/or set points can determine a plurality of settings related to plastic manufacturing such as valve positions, pressure, and/or temperature, etc.

Certain exemplary embodiments can comprise hardware and/or software adapted to provide calibration for the motion control, diagnostic message screens, and temperature control settings when integrated controls, such as integrated controls for temperature, are used. The controls can be adapted for any number of different sets of set points. In plastic blow molding applications a group of set points can be called a parison profile. In certain plastic blow molding applications, the parison profile can be run simultaneously across a plurality of parison heads. Certain exemplary embodiments comprise a control interface to a machine on a single open platform with intuitive screens designed for increased productivity.

In certain exemplary applications, the parison editor can comprise a display graphics, which can employ specially created Active X controls. Dynamic Link Library (DLL) and executable files called by the editor can be downloaded to an operator panel along with an HMI configuration for a project that can be adapted to provide a visualization screen and interface related to controlled device 1200. During panel run time the editor can be called to modify an existing profile, or create and download a new profile to PLC 1300. Individual data points can be shifted using buttons and/or viewed and edited through a table. Separate tables for set points and master points entry can be available. Profile data can also be saved in an external flash card as a recipe, and can be retrieved for reuse by the same machine and/or transferred to another machine.

An information device 1500 can be communicatively coupled to HMI 1400 and/or PLC 1300 via network 1100. Information device 1500 can be adapted to receive, process, and/or render information regarding controlled device 1200 to a remote user via a user interface 1540. Information device 1500 can comprise a user program 1560, which can be adapted to manage information regarding the process.

In certain exemplary embodiments, system 1000 can comprise hardware components such as a: Simatic S7 PLC (e.g., CPU 317) available from Siemens of Alpharetta, Ga., Allen Bradley PLC SLC 100 PLC available from Rockwell Automation of Milwaukee, Wis., Modicon PLC available from Schneider Electric of Palatine, Ill., dedicated hydraulically or electrically operated motion control modules such as RMC 100 available from Delta Computer Systems of Vancouver, Wash., Beckoff's AH2000 series controllers, Allen Bradley's linear positioning module 1771-QB, platform panel MP370 HMI 1400 available from Siemens (e.g., open with Windows CE 3.0), I/O Module, communication cables (e.g., Profibus), and/or connectors adapted to communicatively couple the respective components, etc.

In certain exemplary embodiments, software components of system 1000 can comprise: Visualization Software (Siemens ProTool Pro or WinCC Flex), Siemens Simatic Step 7, application software S7 code specific to an application for sequencing and communication, visualization screens and configuration code for HMI 1400, and/or special .DLL and .EXE files for Active X controls, etc.

Certain exemplary embodiments can be applied to other automated processes where profiles need to be created or modified quickly, and then made available for downloading to controlled devices and/or machines associated with the process. Certain exemplary embodiments can enable a motion control sequence comprising several data entry points that can be readily visualized. Providing editing capabilities on a platform configured as a main interface for control of controlled device 1200 might result in an improved production efficiency for an operator of controlled device 1200.

Figure 2:
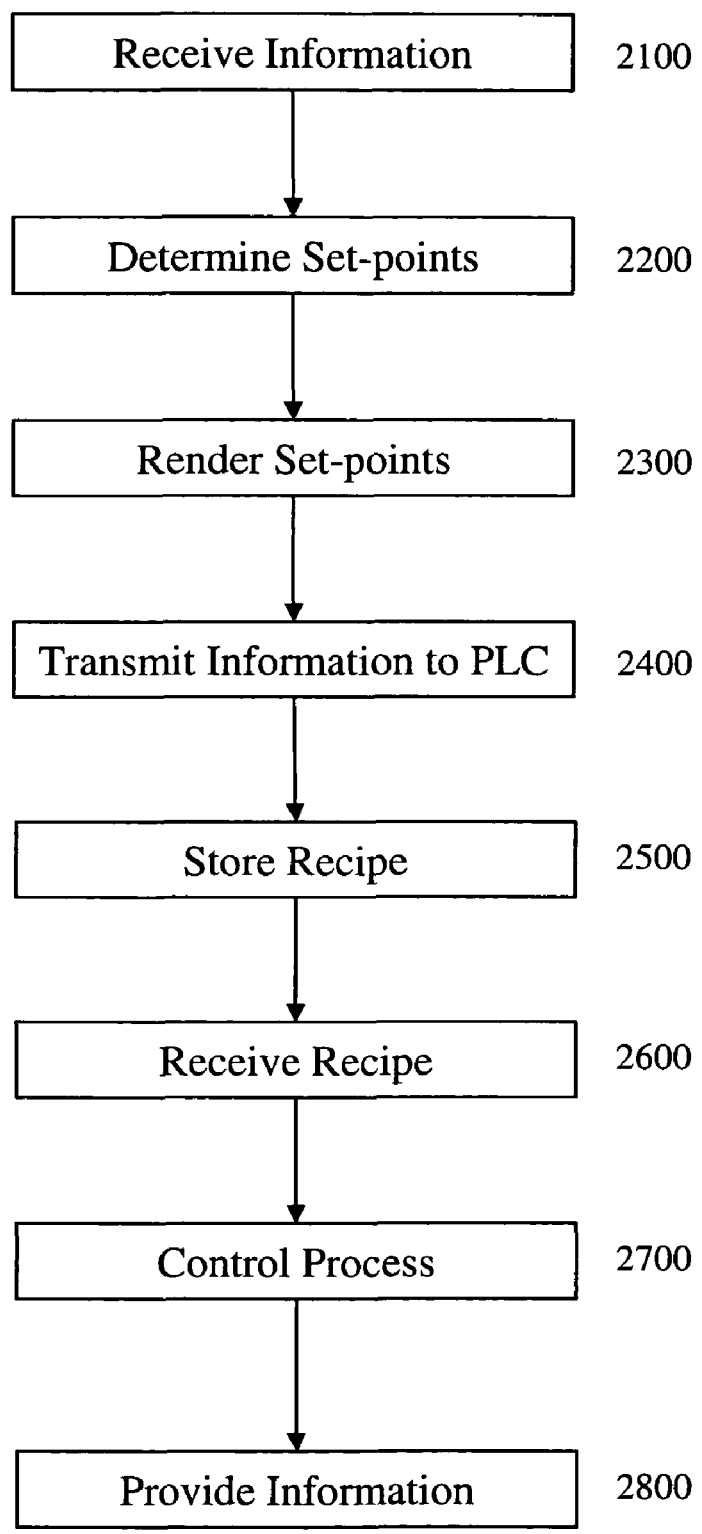
FIG. 2 is a flowchart of an exemplary embodiment of a method 2000.

FIG. 2 is a flowchart of an exemplary embodiment of a method 2000. At activity 2100, information can be received at an HMI. For example a user can provide a value related to at least one master point of a plurality of master points relating to a process. In certain exemplary embodiments, the process can be a plastics blow molding process, which will be used as an example to discuss additional potential activities of method 2000.

At activity 2200, one or more set points can be determined and/or generated at the HMI. For example, the HMI can be adapted to automatically interpolate between a plurality of master points and a plurality of set points for profiling a product associated with the process. The HMI can be adapted to utilize automatic linear interpolation and/or smooth interpolation. Certain exemplary embodiments can comprise a graphical editor running on the HMI. The HMI can comprise an embedded operating system. In certain exemplary embodiments, the profile can be adjusted responsive to information received from and/or provided by the user. In certain exemplary embodiments, the profile can be a parison profile associated with the plastics blow molding process.

At activity 2300, the set points determined at the HMI can be rendered for a user. For example, if the user provides 20 master points via the graphical editor to the HMI, the HMI can be adapted to generate and/or determine a plurality of additional set points related to process control. The HMI can be adapted to render information regarding the plurality of additional set points for the user.

At activity 2400, information can be transferred to the PLC by the HMI via a network, which can comprise the master points and/or set points related to the process. For example, in plastics blow molding applications, the HMI can transfer a parison profile to the PLC. The parison profile can be adapted for use by the PLC in controlling the process. The PLC can comprise a separate and distinct embedded operating system from that of the HMI.

At activity 2500, a recipe related to the process can be created and/or stored. The recipe can comprise a plurality of machine-readable instructions adapted to control at least a portion of the process. For example, the recipe can be related to the plastics blow molding process. The recipe can be stored in a memory device integrated within the HMI and/or physically distinct from the HMI. In certain exemplary embodiments, the recipe can be stored at the PLC.

At activity 2600, the recipe related to the process can be retrieved. The recipe can be retrieved from the memory device and utilized to control at least a part of the process. The recipe can be adapted to be transferred and/or utilized by other processes.

At activity 2700, the process can be controlled utilizing the set points determined by and/or received from the HMI. In certain exemplary embodiments, a PLC can be adapted to automatically control the process and/or a controlled device responsive to information received from the HMI utilizing the graphical editor. The PLC can be communicatively coupled to, yet physically distinct from, the HMI. In plastics blow molding, a plurality of parison heads related to the plastics blow molding process can be simultaneously controlled by the PLC and its associated control program.

At activity 2800, the HMI can provide information for the user. For example, the HMI can be adapted to provide information related to calibration for control of at least one device in the process, a diagnostic message screen related to the process, and/or information related to temperature control settings for the process, etc. For example, the diagnostic message screen can be related to a machine breakdown and/or an abnormal process condition. Exemplary diagnostic messages can comprise messages such as "Safety Door 1 is open", and/or "Extruder Drive Fault", etc.

Figure 3:
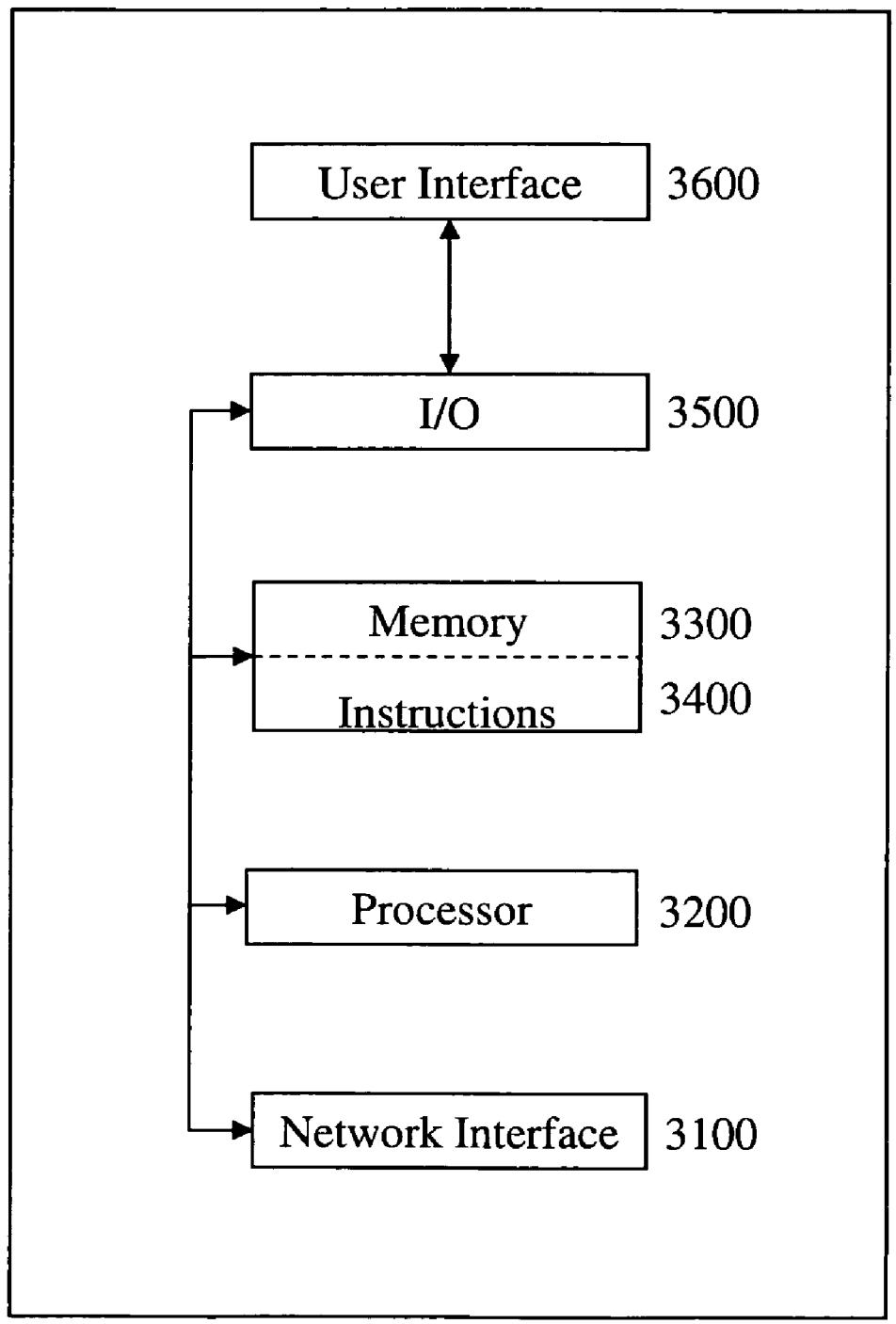
FIG. 3 is a block diagram of an exemplary embodiment of an information device 3000.

FIG. 3 is a block diagram of an exemplary embodiment of an information device 3000, which in certain operative embodiments can comprise, for example, information device 1500 of FIG. 1. Information device 3000 can comprise any of numerous components, such as for example, one or more network interfaces 3100, one or more processors 3200, one or more memories 3300 containing instructions 3400, one or more input/output (I/O) devices 3500, and/or one or more user interfaces 3600 coupled to I/O device 3500, etc.

In certain exemplary embodiments, via one or more user interfaces 3600, such as a graphical user interface, a user can view a rendering of information related to controlling a process utilizing an HMI comprising a first embedded operating system and/or a PLC, which can comprise a second embedded operating system.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A method for controlling a plastics blow molding process, the method comprising a plurality of steps comprising:

via a graphical parison editor running on a human machine interface comprising a first embedded operating system, automatically interpolating between a plurality of master points and a plurality of set points for parison profiling, wherein said human machine interface generates said plurality of set points based on said plurality of master points;

transferring to a programmable logic controller the plurality of set points for parison profiling, via a network;

controlling the plastics blow molding process at the programmable logic controller simultaneously across a plurality of parison heads based on the plurality of set points;

via the parison editor running on the human machine interface, modifying at least one of said plurality of set points during run time of the graphical parison editor to generate at least one modified set point; and during the plastics blow molding process, automatically responding at the programmable logic controller to information received from the graphical parison editor to control the plastics blow molding process based on the received information, the received information related to the at least one modified set point, wherein the programmable logic controller is communicatively coupled to, yet physically distinct from the human machine interface, and the programmable logic controller comprises a second embedded operating system;

said first and second embedded operating systems comprising a plurality of machine-readable instructions that define a limited set of pre-defined functions that cannot be modified or added to by additional user-installed software.

2. The method of claim 1, wherein said automatically interpolating step comprises performing automatic linear interpolation.

3. The method of claim 1, wherein said automatically interpolating step comprises performing smooth interpolation.

4. The method of claim 1, wherein the plurality of set points for parison profiling comprises at least 20 set points.

5. The method of claim 1, wherein the plurality of set points for parison profiling comprises less than 1000 set points.

6. The method of claim 1, further comprising:
providing information, via the human machine interface, related to calibration for motion control of at least one device in the plastics blow molding process.

7. The method of claim 1, further comprising:
providing, via the human machine interface, a diagnostic message screen related to the plastics blow molding process.

8. The method of claim 1, further comprising:
providing information, via the human machine interface, related to temperature control settings for the plastics blow molding process.

9. The method of claim 1, further comprising:
receiving, via the human machine interface, a user provided value related to at least one master point of the plurality of master points.

10. The method of claim 1, further comprising:
generating a parison profile.

11. The method of claim 1, further comprising:
adjusting a parison profile.

12. The method of claim 1, further comprising:
via the human machine interface, receiving a recipe related to the plastics blow molding process.

13. The method of claim 1, further comprising:
via the human machine interface, storing a recipe related to the plastics blow molding process.

14. The method of claim 1, further comprising:
via the human machine interface, retrieving a recipe related to the plastics blow molding process.

15. The method of claim 1, further comprising:
via the programmable logic controller, simultaneously controlling a plurality of parison heads of the plastics blow molding process.

16. The method of claim 1, further comprising:
receiving, at the human machine interface, a dynamic link library file associated with the graphical parison editor.

17. The method of claim 1, further comprising:
receiving, at the human machine interface, an executable file associated with the graphical parison editor.

18. The method of claim 1, wherein the graphical parison editor comprises at least one user interface element created using software components that are interconnected and perform desired functions for an application.

19. The method of claim 1, wherein the human machine interface and the programmable logic controller are communicatively coupled via a field bus network.

20. A plastics blow molding system comprising:
a human machine interface comprising a first embedded operating system, said human machine interface comprising a graphical parison editor, the graphical parison editor configured to interpolate between a plurality of master points and a plurality of set points for parison profiling, wherein said human machine interface generates said plurality of set points based on said plurality of master points, and said parison editor is further configured to modify at least one of said plurality of set points during run time of the graphical parison editor; and
a programmable logic controller communicatively coupled to said human machine interface, said programmable logic controller comprising a second embedded operating system, said programmable logic controller configure to:
receive the plurality of set points for parison profiling via a network,
control a plastics blow molding process simultaneously across a plurality of parison heads based on the plurality of set points, and
during the plastics blow molding process, automatically respond to information related to a modification to at least one of said plurality of set points made via the graphical parison editor and received from the graphical parison editor to control the plastics blow molding process based on the received information;
said first and second embedded operating systems comprising a plurality of machine-readable instructions that define a limited set of pre-defined functions that cannot be modified or added to by additional user-installed software.

21. A method comprising:
via a programmable logic controller:
receiving a plurality of set points for parison profiling via a network;
controlling a plurality of parison heads simultaneously in a plastics blow molding process based on the plurality of set points;
during the plastics blow molding process, automatically responding to information related to a modification to at least one of the plurality of set points made via the graphical parison editor and received from a graphical parison editor to control the plastics blow molding process based on the received information,
wherein the programmable logic controller communicatively coupled to, yet physically distinct from, a human machine interface, the programmable logic controller comprising a first embedded operating system, the human machine interface comprising a second embedded operating system, the graphical parison editor running on the human machine interface configured to automatically interpolate between a plurality of master points and a plurality of set points for parison profiling,
wherein said human machine interface generates said plurality of set points based on said plurality of master points, and said parison editor is further configured to modify at least one of said plurality of set points during run time of the graphical parison editor , and said first and second embedded operating systems comprising a plurality of machine-readable instructions that define a limited set of pre-defined functions that cannot be modified or added to by additional user-installed software.

* * * * *